(12) United States Patent
Umegård et al.

(10) Patent No.: US 8,671,883 B2
(45) Date of Patent: Mar. 18, 2014

(54) MILKING METHOD AND APPARATUS

(75) Inventors: Anders Umegård, Rönninge (SE); John M. Christensen, Börkup (DK)

(73) Assignee: Delaval Holding AB, Tumba (SE)

( * ) Notice: Subject to any disclaimer, the term of this patent is extended or adjusted under 35 U.S.C. 154(b) by 1059 days.

(21) Appl. No.: 10/585,036

(22) PCT Filed: Dec. 22, 2004

(86) PCT No.: PCT/EP2004/014776
§ 371 (c)(1),
(2), (4) Date: May 4, 2007

(87) PCT Pub. No.: WO2005/067701
PCT Pub. Date: Jul. 28, 2005

(65) Prior Publication Data
US 2007/0209595 A1 Sep. 13, 2007

(30) Foreign Application Priority Data
Jan. 8, 2004 (EP) .................................. 04250073

(51) Int. Cl.
*A01J 5/01* (2006.01)

(52) U.S. Cl.
USPC .................. 119/14.02; 119/14.14; 119/14.08

(58) Field of Classification Search
USPC ....................... 119/14.02, 14.08, 14.15, 14.14
See application file for complete search history.

(56) References Cited

U.S. PATENT DOCUMENTS

| | | | | |
|---|---|---|---|---|
| 4,064,838 A | * | 12/1977 | Mukarovsky et al. | 119/14.08 |
| 4,292,926 A | | 10/1981 | Tilman | |
| 4,922,855 A | * | 5/1990 | Tomizawa et al. | 119/14.15 |
| 5,152,246 A | * | 10/1992 | Wakui et al. | 119/14.15 |
| 5,178,095 A | * | 1/1993 | Mein | 119/14.47 |
| 5,568,788 A | * | 10/1996 | van den Berg et al. | 119/14.02 |
| 5,704,311 A | * | 1/1998 | van den Berg | 119/14.02 |
| 5,743,209 A | * | 4/1998 | Bazin et al. | 119/14.08 |
| 5,873,323 A | * | 2/1999 | van den Berg et al. | 119/14.02 |
| 6,009,832 A | * | 1/2000 | Innings et al. | 119/14.02 |
| 6,830,008 B2 | * | 12/2004 | Sjolund et al. | 119/14.08 |
| 6,971,330 B2 | * | 12/2005 | Nilsson | 119/14.02 |
| 7,174,848 B2 | * | 2/2007 | Brown et al. | 119/14.08 |
| 2003/0065480 A1 | | 4/2003 | Vijverberg et al. | |

FOREIGN PATENT DOCUMENTS

| | | |
|---|---|---|
| DE | 41 13 699 A1 | 10/1992 |
| DE | 100 25 866 A1 | 12/2001 |
| EP | 0 657 098 A1 | 6/1995 |
| EP | 0 727 137 A1 | 8/1996 |
| EP | 1 131 996 A2 | 9/2001 |
| EP | 1 297 742 A2 | 4/2003 |
| GB | 1 248 648 A1 | 10/1971 |

* cited by examiner

*Primary Examiner* — Rob Swiatek
*Assistant Examiner* — Danielle Clerkley
(74) *Attorney, Agent, or Firm* — James H. Marsh, Jr.; Stinson Leonard Street LLP

(57) ABSTRACT

An animal milking method and apparatus wherein a single milk meter measures the total milk flow from all four quarters of an animals udder, and the data generated by the milk meter is used to detect a departure from a predicted milk flow versus time relationship, indicative of an injured teat or an infected udder quarter, for altering the herdsman to a condition which warrants medical inspection of the animal concerned.

18 Claims, 2 Drawing Sheets

MILKING METHOD AND APPARATUS

This invention is concerned with milking animals, especially but not necessarily exclusively, cows.

Milking parlours can include many milking stalls in which cows are milked individually and several cows are milked in turn. It is usual for herd management purposes for the amount of milk obtained from each animal during each milking to be measured and recorded. The milk collected from an entire herd can be delivered from the milking stalls into a common storage tank which is emptied periodically. As the milk from different animals becomes mixed together in the storage tank it is necessary to avoid milk of inferior quality, such as milk from a cow suffering from mastitis, being delivered to the storage tank. This makes it desirable to include an automatic system for identifying an animal infected with mastitis so that the animal can be treated and restored to full health. It is well known that mastitis infection generally starts in one udder quarter and then gets transmitted to other quarters, and to enable early diagnosis, a detection system should be capable of recognising symptoms arising due to infection in a single udder quarter. Milk affected by mastitis has an increased salt content and can be recognised by a conductivity sensor, and the use of conductivity sensors in modern milking plants is known. In a robotic milking installation, for example, it is known to provide four metering chambers for measuring separately the milk from each udder of a cow, and to include a respective conductivity sensor in each metering chamber. By comparing conductivity levels a reliable judgement about milk from one udder quarter being infected can be made. In more conventional milking plants, however, the milk from the four udder quarters is mixed together at or before being conducted into a measuring chamber of a milk meter which serves to measure the total milk yield of the animal. Only very limited information regarding animal health could be derived from the total milk yield. It has been previously suggested in Research Disclosure 368041 to record the average milk flow curve during one milking of an animal and to display it during a subsequent milking of the same animal with an alarm being sounded if the actual milk flow deviates drastically from the expected flow pattern. Such an arrangement is not capable of providing reliable early detection of ill health of an animal.

In other prior art disclosures it has been suggested to monitor milk flow to determine the time of actuation of a teat cup removal mechanism, as described in GB 1248648 and U.S. Pat. No. 4,292,926, or to control the vacuum level during milking as described in EP 0727137 and DE 4113699. EP 1131996 discloses a method of automatically milking animals in which milk flow from the respective udder quarters is measured and mastitis-depending threshold values are sensed, but this method demands a separate milk flow sensor in each of the milk lines connected to the respective teat cups.

The present invention aims to improve the efficiency of detecting poor animal health without necessitating the use of measuring equipment in each milk line from the teat cups.

In accordance with a first aspect the present invention provides a method of milking animals comprising measuring the total milk flow from all the teats of the udder of an animal being milked and generating data representative of the milk flow rate, analysing the data to detect an abnormal milk flow from one teat indicated by a predetermined departure from a predicted relationship between the milk flow rate and the time from commencement of milking, and selecting the animal for medical inspection in the event that such a departure is detected.

In accordance with another aspect there is provided by the invention an apparatus for milking animals, comprising a milk meter, a plurality of milk collectors for collecting milk from respective teats of an animal and conducting the milk to the milk meter, the milk meter providing an output representative of the total milk flow from the teats, and a device for receiving data output by the milk meter and analysing the data to detect an abnormal milk flow from one teat indicated by a predetermined departure from a predicted relationship between the milk flow rate and the time from commencement of milking, the device being arranged to generate an output to signal that medical inspection of the animal is advisable in response to such a departure being detected.

One embodiment of the invention relies on analysis of the data generated by a single milk meter which measures the aggregate milk flow from all four udder quarters to detect a departure from a predicted stepped reduction in the milk flow rate towards the end of the milking procedure for the animal. Steps in the milk flow curve, i.e. a graphic representative of the milk flow rate plotted against time, can be conveniently and reliably sensed by calculating the rate of change of the milk flow rate, which is indicative of the slope of the curve. As the milk flow from the respective udder quarters ends, there tends to be a change from a slope of around zero, to a steeply negative slope. In the case of many cows there are usually four step reductions in the milk flow curve, and counting the number of steps can provide a simple technique for detecting an abnormality, such as due to an injured teat or an udder quarter being infected by mastitis.

In another embodiment there are determined a peak flow rate at which the total flow from the udder remains substantially constant or level, i.e. seen averaged over at least one vacuum pulse cycle for each teat, and the duration of the milk flow at the peak flow rate. A reduced peak flow rate without a corresponding reduction in the peak flow duration can be indicative of an injured teat or an udder quarter suffering from mastitis. In a first variant of this embodiment a ratio of the peak flow duration to the peak flow rate is calculated, and the apparatus provides an output by which the animal is labelled for medical inspection if the calculated ratio value exceeds a predicted value. According to another variant, the peak flow rate and the peak flow duration are each compared with respective predicted values, and an output signalling selection of an animal for medical inspection is generated if the peak flow rate departs significantly from the predicted peak flow rate, but the peak flow duration remains within certain acceptable limits of the predicted peak flow duration.

The predicted relationship between the milk flow rate and the time from commencement of milking is preferably derived from data collected during one or more previous milkings of the same animal and for this purpose the data receiving and analysing device may include a memory for storing the predicted relationship derived from data collected during the previous milking or milkings.

To facilitate the transfer of data between a milk meter and a remotely located data receiving and analysing device, such as a central processing unit or computer shared by two or more milking stalls, the milk meter preferably includes means to collect and compress milk flow data into data packages, and to transfer the data to the data receiving and analysing device at intervals. The data receiving and analysing device can comprise means to decompress the data packages for analysis and/or display of the data.

The milk flow rate data generated during milking of an animal can additionally be employed to optimise milking conditions, such as the milking vacuum level, the period of hormone stimulation in preparation for milking, and/or the time of teat cup detachment at the end of milking, during a subsequent milking of the animal.

A more complete understanding of the invention will be gained from the following detailed description of some embodiments, reference being made to the accompanying drawings, in which.

Figure 1:
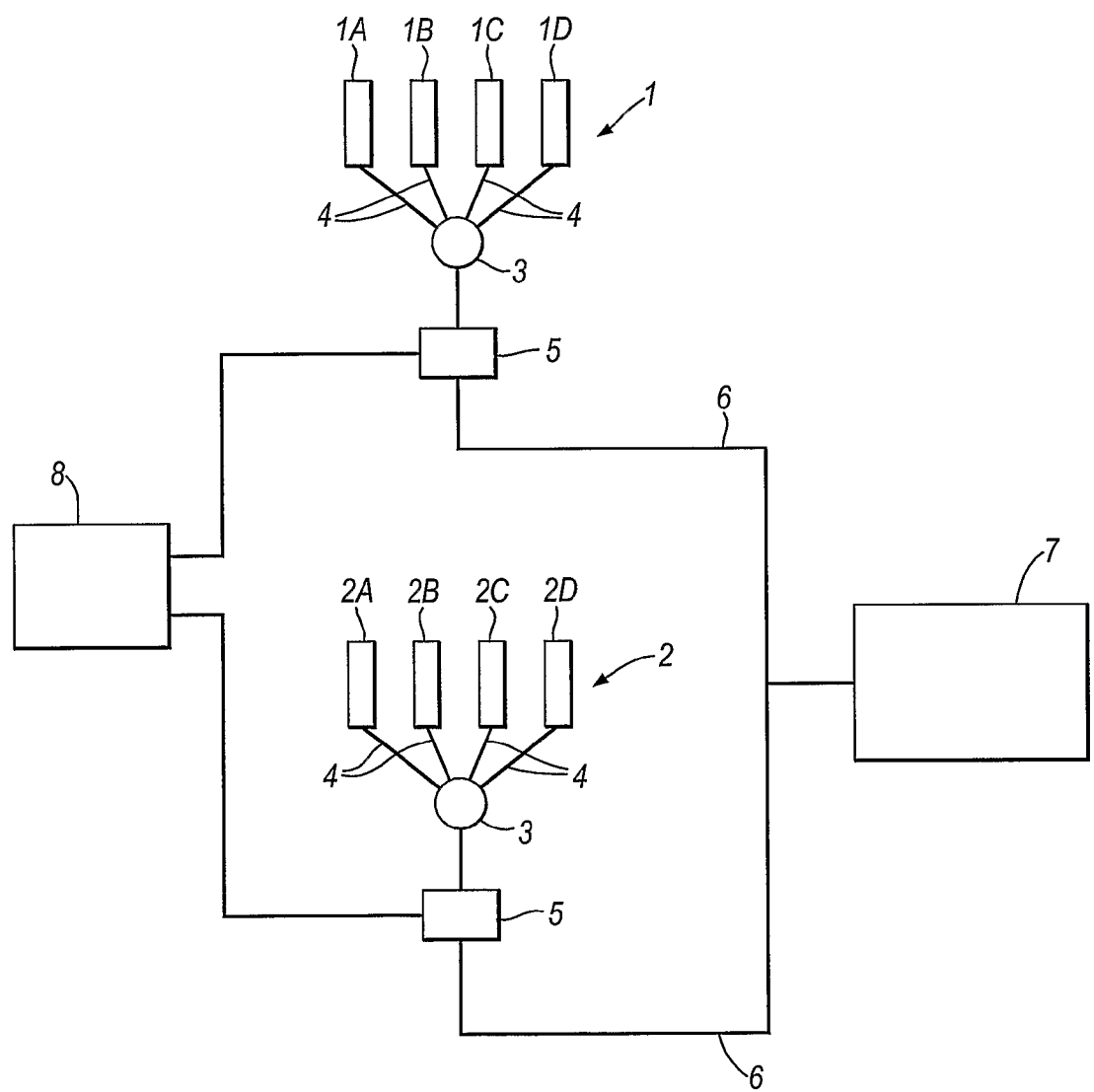
FIG. 1 is schematic illustration of a milking apparatus in accordance with the invention.

Shown in FIG. 1 is a milking apparatus comprising first and second teat cup clusters 1, 2 each with four teat cups 1A, 1B, 1C, 1D and 2A, 2B, 2C, 2D connected to a milk claw 3 by milk tubes 4. Each milk claw is connected to a respective milk meter 5 which measures the total or aggregate milk flow received from the four teat cups of the associated teat cup cluster. Milk discharged from each of the milk meters is conveyed by a pipeline 6 to a common storage tank 7, possibly via a diverter valve for diversion of milk of unacceptable quality, a milk glass and/or other equipment normally employed in milking installations. Although just two teat cup clusters, 1, 2 are shown this is merely representative and as many clusters and associated milk meters 5 may be provided as desired, e.g. corresponding to the number of milking stalls included in the milking parlour. Each milk meter includes a measuring unit to generate data representative of the milk flow rate, preferably averaged over at least one and ideally several milking vacuum pulse cycles to smooth out transient peaks and troughs in the milk flow. The milk meter also provides a data output indicating the duration of milking from the first milk flow into the milk meter. The data generated can be used by a processor incorporated in or associated with the milk meter to provide a local display at the milking stall of the prevailing milk flow rate and/or the milk yield as the milking progresses. The data generated by the milk meter is also transmitted to a central processor 8, such as a computer, in which the received data is analysed and which produces an output either during or at the end of milking an animal to signify that medical inspection of the animal is advisable. The basis on which the central processor can generate such an output is explained below.

Figure 2:
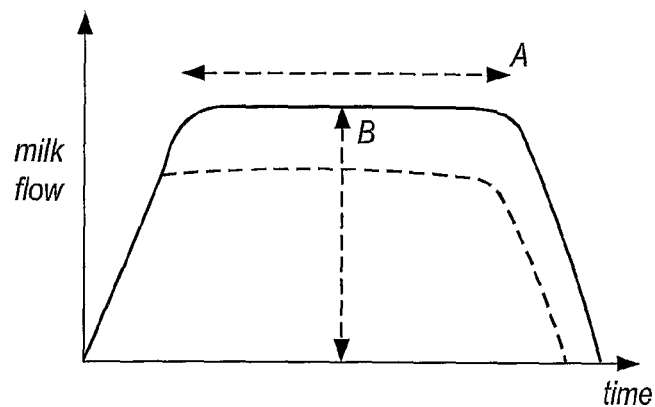
FIG. 2 is a graph showing milk flow plotted against time for one udder quarter.

It is common knowledge that a cow that has an injured teat or an udder quarter infected with mastitis will yield less milk than expected. FIG. 2 illustrates a typical milk flow curve for a normal healthy teat which is shown in full line, and for an injured or infected teat, shown in broken line. However, the total milk yield from a cow is not in itself indicative of the health status of the cow because there are many factors which influence the milk yield, including the time since the last milking, the food intake and the quality of the feed, and the general well being of the cow. Stress, general illness, poor feeding and a bad or inconsistent milking regime may result in diminished milk yields. It has now been recognised, however, that the milk flow curves can be relied upon to provide an effective indication that a cow is probably suffering from udder infection or an injured teat and is deserving of medical inspection to confirm the condition or eliminate suspicion.

As is apparent from FIG. 2, at the commencement of milking, provided the cow has been adequately stimulated for release of hormones that assist milk release, the milk flow from an udder quarter rises rapidly to a peak flow rate at which the flow remains substantially level for a major part of the milking period, the milk flow curve having a plateau corresponding to the duration of the peak flow. Towards the end of milking the flow rate falls fairly quickly as the udder quarter is emptied. There are two notable characteristics of the flow curve, namely the length of the plateau, that is the duration of the milk flow at the peak flow rate (referred to herein as the "peak flow duration") denoted in FIG. 2 by the letter A, and the peak flow rate which is denoted by the letter B. When teat is injured or is suffering from onset of mastitis, the peak flow duration and the peak flow rate will be less than would be the case for that teat if it was in a healthy condition, as depicted by the broken line in FIG. 2. However, not all udder quarters have the same flow characteristics, and they even differ from one udder quarter to the next for the same cow. As a consequence, a typical milk flow curve for a healthy cow appears as shown by the full line in FIG. 3. This curve is composed of the curves for the respective teats added together, it being realised that not all four udders will reach their peak flow rate at the same time and not all will have the same peak flow duration. Towards the end of milking, the milk flow diminishes from the peak flow at different times for the respective teats whereby the flow curve has a stepped profile with each step having a trailing edge, depicted by the triangles in FIG. 3, coinciding with the end of the peak flow durations of the respective teats. It will be appreciated that the data output by the milk meters 5 in FIG. 1 will correspond to the milk flow curve shown in FIG. 3. The milk flow meters measure the milk flow rate and integrate the milk flow over time to calculate the milk yield. Since there are four udder quarters and four teats, there are four distinct steps on the flow curve towards the end of the milking procedure and an analysing device can be arranged to detect and count the number of steps included in the milk flow curve. Less than four steps can be indicative that the milk flow from one teat is not as predicted and hence there is a likelihood of a teat being injured or one udder quarter being infected such as by mastitis. The steps in the milk flow curve can be conveniently and efficiently sensed by calculating the slope of the curve, that is the rate of change of the milk flow rate. At each horizontal or level step portion the slope is close to zero, and as the curve drops from one step to the next the slope changes to sharply negative before becoming close to zero once more. The slope changes can be sensed by appropriate analysis of the data received to provide an efficient and effective way of counting the number of steps in the flow curve.

It will be understood that variations in milk flow curves will occur for individual animals and not all will have four clear distinct steps to their normal milk flow curve. However, through a statistical approach the number of clear drops can be reliably estimated. Provided that the number of stepwise reductions has been correctly measured, with acceptable certainty, and the statistical model shows with significance that the number of steps is less than predicted, an alert is set by the data analysing device to signal to the herdsman that the cow should be inspected because a teat injury, infection by mastitis or other ill health of the cow is suspected. This information, which is valuable for herd management purposes, is obtained through use of a single milk meter, meaning that the benefits are available in many existing milking plants without having to modify the milking equipment. Only the data generating and analysis equipment may require alteration and that may involve only appropriate programming or addition to the software handling capabilities.

Figure 3:
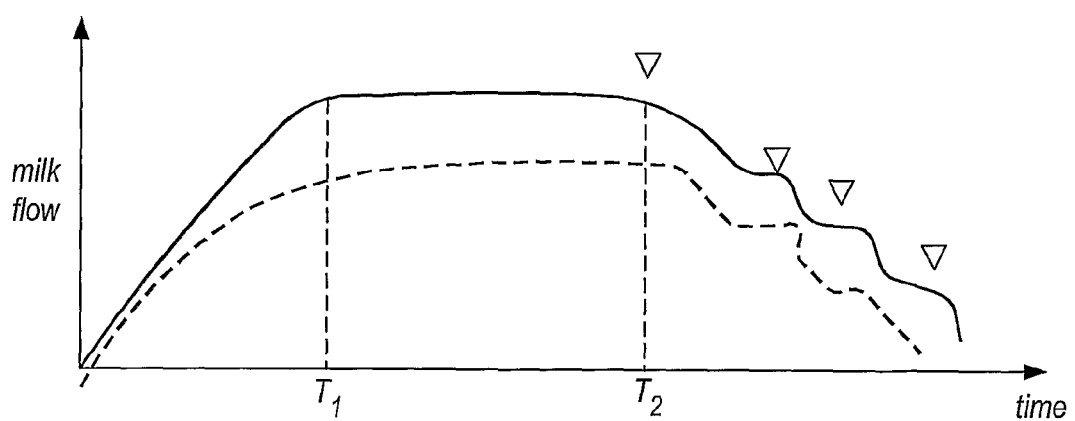
FIG. 3 is a graph showing milk flow plotted against time for all four quarters of an udder.

As explained above, the milk flow curve, whether for an individual teat as shown in FIG. 2, or for all four udder quarters as shown in FIG. 3, has a characteristic peak flow rate and a peak flow duration. The peak level or plateau of the flow curve can be estimated such as by averaging or least-square-estimating method, to eliminate transient fluctuations and arrive at a peak flow with a zero slope having a specific peak flow rate and a specific peak flow duration. The peak flow duration is the time that elapses between the peak flow being reached, i.e. $T_1$ in FIG. 3, and the time $T_2$ at which the flow starts to decrease. From the data generated by the milk meter and using a suitable statistical model, taking into account variations for individual cows and milk meter characteristics, the peak flow rate and the peak flow duration can be determined accurately by the data receiving and analysing device. If one teat is injured or the corresponding udder quarter is affected by mastitis, but the other teats remain healthy, the peak flow rate is diminished with a significant factor, yet the peak flow duration will not be decreased to the same extent and may even remain unchanged, for example as shown as shown by the broken line in FIG. 3. This in contrast to the way in which the milk flow is influenced by other variable factors such as poor feeding or stress, when there is a general decrease in milk yield with peak flow duration being reduced more significantly than the peak flow rate. The peak flow rate is not directly correlated to the milk yield. With fixed milking vacuum levels, the physical characteristics of the cow and limitations of the milking equipment mean that for an individual cow the peak flow rate will be more or less constant as long as the four udder quarters and teats are all well and healthy. The peak flow duration has a closer relationship to the total milk yield. Having regard to the manner in which the milk flow curve is modified by these influences, a ratio of the peak flow duration to peak flow rate can be calculated to give an indication that an injured or infected teat is suspected. In particular a factor F can be calculated from the equation $$F = \frac{\text{peak flow duration}}{\text{peak flow rate}}$$

and if the factor F exceeds a predicted value by a significant amount it is indicative that there is a very strong chance that a teat is injured or an udder quarter is infected. The data analysing device is arranged to make the calculation using the data received from the milk meter and to generate a signal to alert the herdsman that the animal in question should be medically inspected because a teat injury or an infection is expected. It is believed that a high level of accuracy in predicting injury or infection can be achieved by this technique for example better than 90% or 95% and possibly as high as 99% confidence. It will be beneficial if the predicted factor level is based on data recorded during one or most preferably several previous milkings of the same animal and the data receiving and analysing device can incorporate a memory for storing recorded data from earlier milkings.

It is not essential for a ratio or factor F to be calculated as described above and other methods of handling the data generated by the milk meter are possible in order to determine whether there is reason to suspect an injured teat or infected udder quarter and hence whether it is appropriate to generate an output to alert the herdsman to the fact that medical inspection of the cow's udder is advisable. As an example of another method, the data receiving and analysing device can be programmed to compare the peak flow rate with a predicted flow rate and compare the peak flow duration with a predicted peak flow duration, the predicted values being determined taking into account statistical factors. When there is a significant deviation between the actual peak flow rate determined from the data output by the milk meter during the milking of an animal and the predicted peak flow rate for that animal, but the peak flow duration during that milking, again determined from data generated by the milk meter, does not differ significantly from, i.e. remains within acceptable limits of, the predicted peak flow duration for that milking of that particular animal, it is indicative of a strong probability that a teat is injured or an udder is infected such as by mastitis and an output can be triggered to alert the herdsman of a medical inspection of the animal being recommended.

It will be appreciated that the methods described above can be employed to provide reliable warnings to a herdsman that an animal is suffering from an injured teat or an infection of the udder, and that these methods can easily be implemented in existing milking parlours equipped with single milk meters for measuring the total milk flow from the four teats of an animal. Consequently the method provides a cheap alternative to installing multiple metering chambers in association with respective teat cups and/or conductivity meters, for establishing existence mastitis infections which can cause serious damage to farm business if allowed to spread unchecked due to a failure to detect the infection and treat the infected animals.

The data provided by the milk meter can also be utilised for other purposes in order to improve the milking conditions. It is, for example, important to remove the teat cups from the teats at the appropriate time in order to avoid milk yield being reduced, and/or the residual milk left behind causing health problems to the cow, due to the teat cup cluster being removed too early, or to avoid the milking time being extended, which may result in significant extra milking time for an entire herd, due to the cluster removal being delayed. Based on accurate milk flow rate data generated by the milk meter, the cluster can be removed reliably as soon as the flow rate falls to the level chosen for teat cup removal. In addition, the data transmitted from the milk meter can be relied upon for setting other milking parameters during a subsequent milking of the same animal, such as the milking vacuum level, the period of hormone stimulation in preparation for milking, or possibly to detect oestrus. It is normal practice to massage the udder of a cow as a preliminary step prior to actual milking. This stimulation encourages the release of Oxytocin, a hormone responsible for enabling milk let down. During oestrus milk let down can be delayed because other hormones such as adrenaline may be present and block the release of oxytocin. If premilking stimulation is inadequate, the milk flow curve, instead of rising smoothly to the peak flow rate can suffer a dip before the peak flow rate is reached. The data analysing device can be adapted to allow detection of such a dip in the flow curve and assist the herdsman is establishing an appropriate stimulation routine for the animal concerned at the next milking. The milk flow curve can be displayed graphically for visual analysis or the data analysing device may check the data automatically and generate an output to signal the inadequate stimulation to the herdsman.

The facilitate the transmission of large amounts of data between the milk meters 5 and the data receiving and analysing device 8, in a preferred arrangement each milk meter includes a means, most conveniently a software programme, to compress data relating to or representative of the milk flow curve into data packages and to transfer the packaged data periodically to the data receiving and analysing device which includes means, in particular a software programme, to decompress the packaged data for analysis and or display. In this way large amounts of data can be transferred along bus cables interconnecting the milk meters 5 with the data receiving and analysing device 8. The milk meters 5 ideally each have incorporated or closely associated therewith a processor for processing data and generating the milk flow curves, whereas the data receiving and analysing device is a computer which records the data and allows display of the milk flow curve produced by any selected milk meter.

The invention claimed is:

1. A method of assuring the quality of milk produced in an automated milking facility comprising:
   simultaneously collecting milk from all of the teats of an animal being milked to produce a multiplicity of separate streams of collected milk;
   combining the separate streams of collected milk to produce a current total combined milk flow;
   using a single milk meter device to measure the current total combined milk flow and generate current data representative of the current total combined milk flow rate of the milk being produced by said animal;
   saving data from previous milkings of said animal representative of the average relationship between elapsed time subsequent to the initiation of a milking procedure and a normal total combined milk flow rate for said animal, said relationship including a plurality of stepped flow rate reductions in the normal total combined milk flow rate toward the end of the milking procedure;
   comparing the currently generated data with the saved data in an effort to detect an abnormality in the current total combined milk flow rate, said abnormality comprising an improperly timed or missing stepped reduction in the current total combined milk flow rate;
   generating an output signal in response to the detection of a said abnormality; and
   targeting the animal being milked for medical inspection utilizing said output signal.

2. A method according to claim 1, wherein said comparing comprises calculation of the rate of change in the reducing total combined milk flow rate in order to determine step changes in the milk flow rate.

3. A method according to claim 1, wherein the stepped flow rate reductions in the normal total combined milk flow rate includes four step changes, and wherein each of the step changes corresponds to the decreasing milk flow from each respective teat at the end of milking.

4. A method according to claim 1, wherein the saved data is collected during one or more previous milkings of said animal.

5. A method according to claim 1, wherein milking conditions, namely the milking vacuum level, the period of hormone stimulation preparatory to milking, and/or the time of teat cup detachment at the end of milking, for a subsequent milking of the animal, are determined in accordance with total combined milk flow rate data generated during the milking of the same animal.

6. A method according to claim 1, wherein said comparing includes determining a peak flow rate at which the flow rate remains substantially level for a major part of the animal milking procedure, and determining the duration of the milk flow at the peak flow rate.

7. A method according to claim 6, wherein a ratio of the peak flow duration to the peak flow rate of the total combined milk flow is calculated and said targeting is dependent on the calculated ratio value exceeding a value calculated from the saved data.

8. A method according to claim 6, wherein the peak flow rate and the duration at the peak flow rate of the total combined milk flow are respectively compared with values calculated from the saved data, the animal being targeted for medical inspection when the peak flow rate of the total combined milk flow departs significantly from the peak flow rate calculated from the saved data but the peak flow duration of the total combined milk flow remains within acceptable limits of the calculated peak flow duration.

9. A method of assuring the quality of milk produced in an automated milking facility comprising:
   simultaneously collecting milk from all of the teats of an animal being milked to produce a multiplicity of separate streams of collected milk;
   combining the separate streams of collected milk to produce a current total combined milk flow;
   using a single milk meter device to measure the current total combined milk flow and generate current data, representative of a current total combined milk flow rate of the milk being produced by said animal;
   saving data from previous milkings of said animal representative of the average relationship between elapsed time subsequent to the initiation of a milking procedure and a normal total combined milk flow rate for said animal, said relationship including a plurality of stepped flow rate reductions in the normal total combined milk flow rate toward the end of the milking procedure;
   comparing the currently generated data with the saved data in an effort to detect an abnormality in the current total combined milk flow rate, said abnormality comprising an improperly timed, an improperly shaped or a missing stepped reduction in the current total combined milk flow rate;
   generating an output signal in response to the detection of a said abnormality; and
   targeting the animal being milked for medical inspection utilizing said output signal.

10. An apparatus for assuring the quality of milk produced in an automated milking facility comprising:
    a plurality of teat cups, each said teat cup being attachable to a respective teat of an animal to be milked for simultaneously collecting milk from said teats, whereby to produce a multiplicity of separate streams of collected milk;
    a milk claw connected to said teat cups to combine the separate streams of collected milk and produce a total combined milk flow therefrom;
    a single milk meter to measure said total combined milk flow from said animal and generate current data representative of a current total combined milk flow rate from said animal;
    a memory for collecting and saving data from previous milkings of said animal representative of an average relationship between elapsed time subsequent to the initiation of a milking procedure and a normal total combined milk flow rate for said animal, said relationship including a plurality of stepped flow rate reductions toward the end of the milking procedure;
    a data analyzer associated with said memory for (1) comparing the currently generated data with the saved data in an effort to detect an abnormality in the current total combined total milk flow rate, said abnormality comprising an improperly timed or missing stepped reduction in the current total combined milk flow rate, (2) generating an output signal in response to the detection of a said abnormality, and (3) utilizing said output signal to target an animal being milked for medical inspection,
    wherein said data analyzer counts the number of steps in the reducing total combined milk flow rate and generates said signal if less than four steps are counted.

11. An apparatus according to claim 10, wherein the data analyzer is arranged to calculate the rate of change in the current reducing total combined milk flow rate in order to determine step changes in the current total combined milk flow rate.

12. An apparatus according to claim 10, wherein the memory stores data collected during one or more previous milkings of said animal.

13. An apparatus according to claim 10, wherein the milk meter includes means to collect and compress milk flow data into data packages and to transfer the data packages to the data analyzer at intervals.

14. An apparatus according to claim 13, wherein the data analyzer receives data packages from at least two milk meters and includes means for decompressing the data packages for analysis and/or display of the data.

15. An apparatus according to claim 10, wherein the milk meter and the analyzer generate and analyze data to determine a peak flow rate at which the flow rate remains substantially level for a major part of the animal milking procedure, and determine the duration of the milk flow at the peak flow rate.

16. An apparatus according to claim 15, wherein the data analyzer calculates a ratio of the peak flow duration to the peak flow rate of the total combined milk flow and generates an output when the calculated ratio exceeds a value calculated from the saved data by a predetermined amount.

17. An apparatus according to claim 16, wherein the data analyzer compares the peak flow rate and the duration at the peak flow rate of the current total combined milk flow with respective values calculated from the saved data, and generates an output when the peak flow rate of the current total combined milk flow deviates significantly from the calculated peak flow rate but the peak flow duration of the current total combined milk flow remains within acceptable limits of the calculated peak flow duration.

18. An apparatus for assuring the quality of milk produced in an automated milking facility comprising:

a plurality of teat cups, each said teat cup being attachable to a respective teat of an animal to be milked for simultaneously collecting milk from said teats, whereby to produce a multiplicity of separate streams of collected milk;

a milk claw connected to said teat cups to combine the separate streams of collected milk and produce a total combined milk flow therefrom;

a single milk meter to measure a current total combined milk flow from said animal and generate current data representative of a current total combined milk flow rate from said animal;

a memory for collecting and saving data from previous milkings of said animal representative of an average relationship between elapsed time subsequent to the initiation of a milking procedure and the normal total combined milk flow rate for said animal, said relationship including a plurality of stepped flow rate reductions toward the end of the milking procedure;

a data analyzer associated with said memory for (1) comparing the currently generated data with the saved data in an effort to detect an abnormality in the current total combined milk flow rate, said abnormality comprising an improperly shaped, improperly timed, or missing stepped reduction in the current total combined milk flow rate, (2) generating an output signal in response to the detection of a said abnormality, and (3) utilizing said output signal to target an animal being milked for medical inspection, wherein there are a number of properly timed or properly shaped steps in the normal total combined milk flow rate represented in the saved data, and said data analyzer (1) counts the number of properly timed steps in the current reducing total combined milk flow rate and generates said signal if the number counted is less than said number, or (2) counts the number of properly shaped steps in the current reducing total combined milk flow rate and generates said signal if the number counted is less than said number.

* * * * *